US00RE49945E

(19) United States
(12) Reissued Patent
Lu et al.

(10) Patent Number: US RE49,945 E
(45) Date of Reissued Patent: Apr. 30, 2024

(54) DISPLAY SCREEN WITH GRAPHICAL USER INTERFACE

(71) Applicant: Industrial Technology Research Institute, Hsinchu (TW)

(72) Inventors: Chia-Pei Lu, Hsinchu (TW); Tsu-Yi Ren, Kaohsiung (TW)

(73) Assignee: INDUSTRIAL TECHNOLOGY RESEARCH INSTITUTE, Hsinchu (TW)

(21) Appl. No.: 29/863,994

(22) Filed: Dec. 26, 2022

Related U.S. Patent Documents

Reissue of:
(64) Patent No.: Des. 940,187
Issued: Jan. 4, 2022
Appl. No.: 29/675,074
Filed: Dec. 28, 2018

(51) LOC (14) Cl. ..... 14-04
(52) U.S. Cl.
USPC ..... D14/487
(58) Field of Classification Search
USPC ..... D14/485–495; D18/26, 31, 32, 33; D20/11, 12, 23, 24, 25, 29, 30, 31, 32, D20/36, 37, 38
CPC ..... G06F 3/048; G06F 3/0481; G06F 3/0482; G06F 3/04817; G06F 3/04812
See application file for complete search history.

(56) References Cited

U.S. PATENT DOCUMENTS

D297,243 S * 8/1988 Wells-Papanek ..... D14/487
D656,945 S * 4/2012 Lee ..... D14/486
D689,893 S * 9/2013 Perry ..... D14/486
D748,646 S * 2/2016 Kim ..... D14/485
D749,619 S * 2/2016 Coburn ..... D14/486
D762,234 S * 7/2016 Li ..... D14/487
D766,257 S * 9/2016 Zhang ..... D14/485
D767,592 S * 9/2016 Zhang ..... D14/485
9,785,312 B1 * 10/2017 Sanchez ..... G06F 16/2457
D816,104 S * 4/2018 Rauschenbach ..... D14/486
D816,708 S * 5/2018 Riedel ..... D14/487
(Continued)

FOREIGN PATENT DOCUMENTS

TW D186419 11/2017

OTHER PUBLICATIONS

Filipetrm. How to make md-chips overflow horizontally. Stack Overflow, published Nov. 17, 2017 (Retrieved from the Internet Nov. 12, 2020). Internet URL: <https://stackoverflow.com/questions/47157984/how-to-make-md-chips-overflow-horizontally> (Year: 2017).*

(Continued)

*Primary Examiner* — Darlington Ly

(57) CLAIM

The ornamental design for a display screen with graphical user interface, as shown and described.

DESCRIPTION

FIG. 1 is a front view of a display screen with a graphical user interface showing a first embodiment of our new design; and,
FIG. 2 is a front view of a display screen with a graphical user interface showing a second embodiment of our new design.
The dot-dash-dot broken lines show the display screen and form no part of the claimed design. The evenly broken lines illustrate portions of the graphical user interface that forms no part of the claimed design. The broken line areas include all of the English and Chinese characters and form no part of the claimed design.

1 Claim, 2 Drawing Sheets

Matter enclosed in heavy brackets [ ] appears in the original patent but forms no part of this reissue; matter printed in italics indicates the additions made by reissue.

(Amended)

(56) References Cited

U.S. PATENT DOCUMENTS

| | | | | | |
|---|---|---|---|---|---|
| D816,709 | S | * | 5/2018 | Riedel | D14/487 |
| D819,681 | S | | 6/2018 | Fung et al. | |
| D830,403 | S | * | 10/2018 | Subash | D14/488 |
| D837,255 | S | * | 1/2019 | Lucas | D14/487 |
| D837,816 | S | * | 1/2019 | Sanchez | D14/486 |
| D837,817 | S | * | 1/2019 | Sanchez | D14/486 |
| D838,287 | S | * | 1/2019 | Low | D14/486 |
| D839,296 | S | * | 1/2019 | Sanchez | D14/486 |
| D839,902 | S | * | 2/2019 | Low | D14/486 |
| D847,824 | S | * | 5/2019 | Toth | D14/488 |
| D854,560 | S | * | 7/2019 | Field | D14/486 |
| D854,566 | S | * | 7/2019 | Hsueh | D14/488 |
| D861,029 | S | * | 9/2019 | Toth | D14/487 |
| D870,756 | S | * | 12/2019 | Tabrizi | D14/485 |
| 10,521,073 | B2 | * | 12/2019 | Dukhon | G06F 3/0482 |
| D874,491 | S | * | 2/2020 | Kuo | D14/486 |
| D877,162 | S | * | 3/2020 | Hanson | D14/485 |
| D878,395 | S | * | 3/2020 | Feng | D14/485 |
| D879,816 | S | * | 3/2020 | Hodgson | D14/488 |
| 10,586,618 | B2 | * | 3/2020 | Schulze | A61B 5/7475 |
| D881,221 | S | * | 4/2020 | Chen | D14/488 |
| D881,933 | S | * | 4/2020 | Lawrence | D14/488 |
| D882,612 | S | * | 4/2020 | Antillon | D14/488 |
| D882,614 | S | * | 4/2020 | Zumbrunnen | D14/488 |
| D884,724 | S | * | 5/2020 | VanDuyn | D14/486 |
| D886,128 | S | * | 6/2020 | Fatnani | D14/485 |
| D890,190 | S | * | 7/2020 | VanDuyn | D14/485 |
| D892,150 | S | * | 8/2020 | Feng | D14/486 |
| D892,817 | S | * | 8/2020 | Feng | D14/485 |
| D894,206 | S | * | 8/2020 | Naruns | D14/488 |
| D894,951 | S | * | 9/2020 | Krishna | D14/488 |
| D901,530 | S | * | 11/2020 | Maier | D14/486 |
| D901,531 | S | * | 11/2020 | Maier | D14/486 |
| D905,701 | S | * | 12/2020 | Feng | D14/487 |
| D914,743 | S | * | 3/2021 | Cha | D14/487 |
| D916,870 | S | * | 4/2021 | Hemsley | D14/488 |
| D916,871 | S | * | 4/2021 | Grantham | D14/488 |
| D926,204 | S | * | 7/2021 | Hardy | D14/486 |
| 2006/0111953 | A1 | * | 5/2006 | Setya | G06Q 10/10 705/7.26 |
| 2018/0356952 | A1 | * | 12/2018 | Boothroyd | G06Q 10/10 |

OTHER PUBLICATIONS

User3924438. "Flow Layout in flutter example." Stack Overflow, published Apr. 30, 2018 (Retrieved from the Internet Nov. 12, 2020). Internet URL: <https://stackoverflow.com/questions/50096734/flow-layout-in-flutter-example> (Year: 2018).*

Karababa, Firat. "Chips: Material Components for Android." Material Design in Action, published Jul. 22, 2018 (Retrieved from the Internet Nov. 12, 2020). Internet URL: <https://medium.com/material-design-in-action/chips-material-components-for-android-46001664a40f> (Year: 2018).*

Birch, Joe. "Exploring the v28 Android Design Support Library Additions." Google Developers Experts, published Apr. 19, 2018 (Retrieved from the Internet Nov. 16, 2020). Internet URL: <https://medium.com/google-developer-experts/exploring-the-v28-android-design-support-library-2c96c6031ae8> (Year: 2018).*

Byagowi, Ebrahim. Answer to "Android howto center align chips in chipgroup?" Stack Overflow, published Aug. 16, 2018 (Retrieved from the Internet Nov. 16, 2020). Internet URL: <https://stackoverflow.com/questions/51199787/android-how-to-center-align-chips-in-chipgroup> (Year: 2018).*

Notte, David. "Add tags." Dribbble, published Jun. 28, 2011 (Retrieved from the Internet Aug. 11, 2021). Internet URL: < https://dribbble.com/shots/200746-Add-tags> (Year: 2011).*

Filipetrm. "html—How to make md-chips overflow horizontally." Stack Overflow, published Nov. 7, 2017 (Retrieved from the Internet Nov. 12, 2020). Internet URL: <https://stackoverflow.com/questions/47157984/how-to-make-md-chips-overflow-horizontally> (Year: 2017).*

Adamszeptycki. "Bad ui for select with chip." GitHub, published Mar. 11, 2018 (Retrieved from the Internet Aug. 11, 2021). Internet URL: <https://github.com/mui-org/material-ui/issues/10609> (Year: 2018).*

Karabara, Firat. "Chips: Material Components for Android." Material Design in Action, published Jul. 22, 2018 (Retrieved from the Internet Aug. 12, 2021). Internet URL: <https://medium.com/material-design-in-action/chips-material-components-for-android-46001664a40f> (Year: 2018).*

Francis. "Answer to 'textview—dynamically create a collection or words with ui like tags.'" Stack Overflow, published Nov. 29, 2018 (Retrieved from the Internet Aug. 11, 2021). Internet URL: <https://stackoverflow.com/questions/22114971/android-dynamically-create-a-collection-of-words-with-ui-like-tags> (Year: 2018).*

Seraphin, Brice. "Filter Widget UI Design." EpicPxls, published Jun. 7, 2018 (Retrieve from the Internet Aug. 11, 2021). Internet URL: <https://www.epicxls.com/items/filters-widget-ui-design> (Year: 2018).*

* cited by examiner

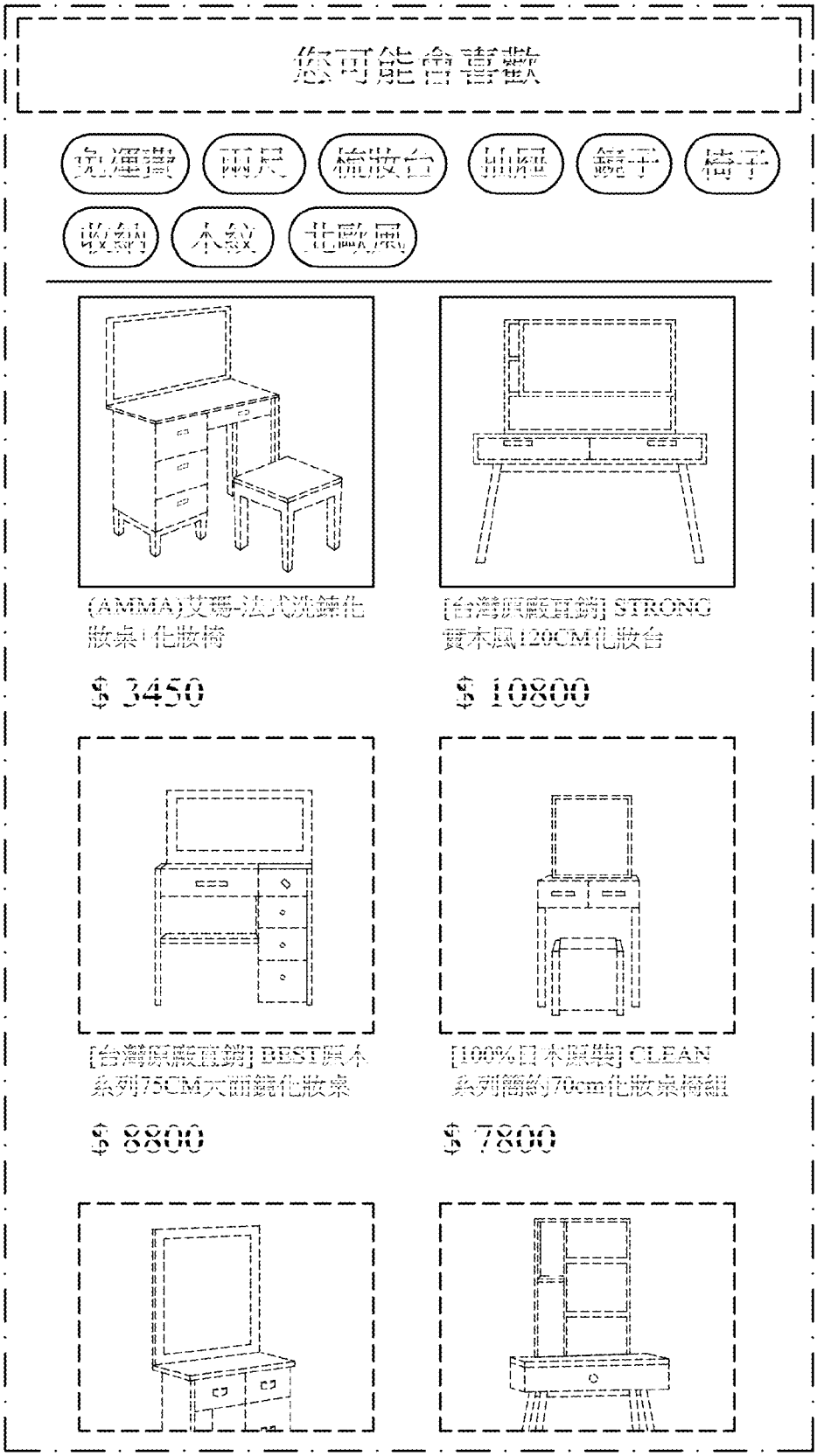
FIG. 1 (Amended)

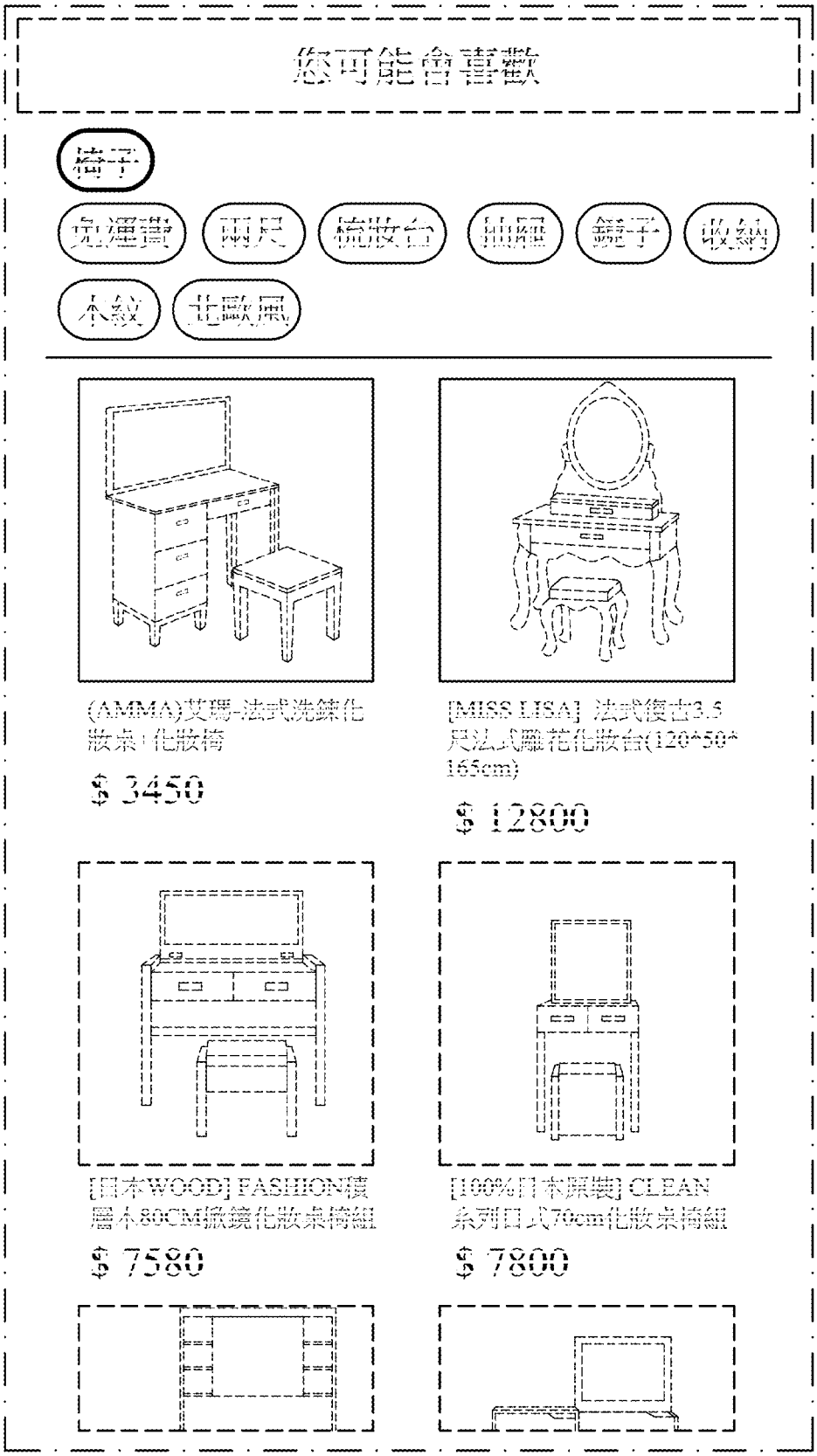
FIG. 2 (Amended)